A. B. FOANS.
GO-CART.
APPLICATION FILED MAY 16, 1918.

1,305,207.

Patented May 27, 1919.

WITNESSES:
William Miller
John A Bergstrom

INVENTOR
Andrew B. Foans
BY
Hauff & Darland.
ATTORNEYS

A. B. FOANS.
GO-CART.
APPLICATION FILED MAY 16, 1918.
1,305,207.
Patented May 27, 1919.
2 SHEETS—SHEET 2.
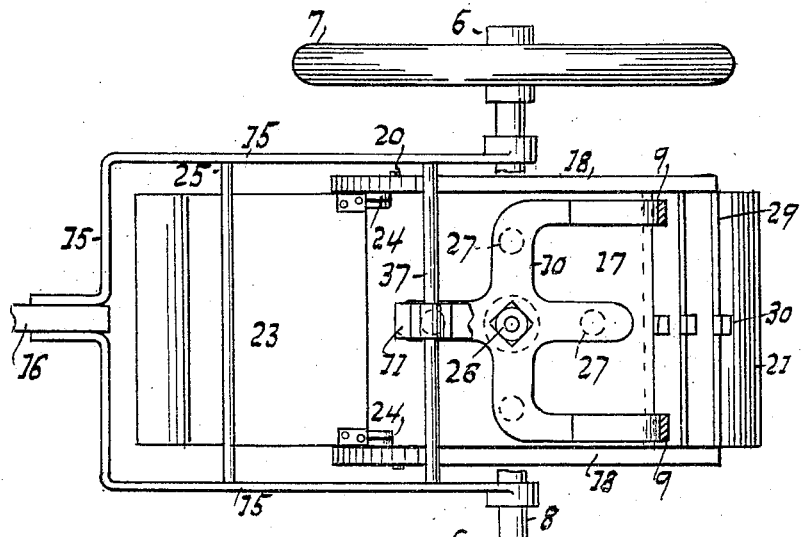
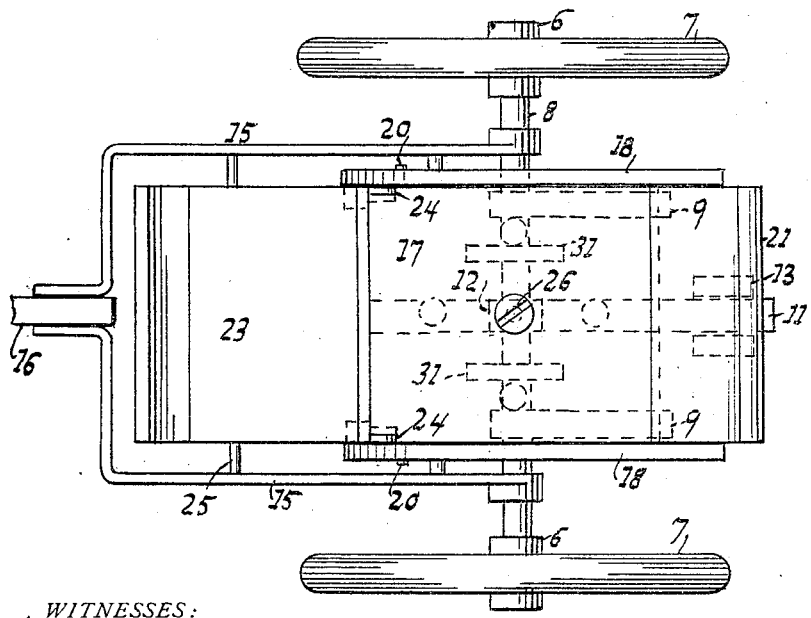
WITNESSES:
William Miller
John A Bergstrom
INVENTOR
Andrew B. Foans
BY
Hauff & Barland
ATTORNEYS

UNITED STATES PATENT OFFICE.

ANDREW B. FOANS, OF NEW YORK, N. Y.

GO-CART.

1,305,207.　　　　　Specification of Letters Patent.　　Patented May 27, 1919.

Application filed May 16, 1918. Serial No. 234,925.

*To all whom it may concern:*

Be it known that I, ANDREW B. FOANS, a citizen of the United States, residing at New York, in the county of New York and State of New York, have invented new and useful Improvements in Go-Carts, of which the following is a specification.

This invention relates to a foldable go-cart which is especially adapted for carrying a child, and it includes means for moving the body of the cart below the axle when it is folded or out of action.

The invention is designed to provide a collapsible body having means for oscillating it, so that the child can ride either backward or facing the forward travel of the vehicle.

The invention resides in the novel combinations hereinafter described and claimed, reference being made to the accompanying drawings in which:—

Fig. 3 is an inverted plan view of Fig. 1 showing the bar and springs in section.

Fig. 4 is a plan view of the same.

Figure 1:
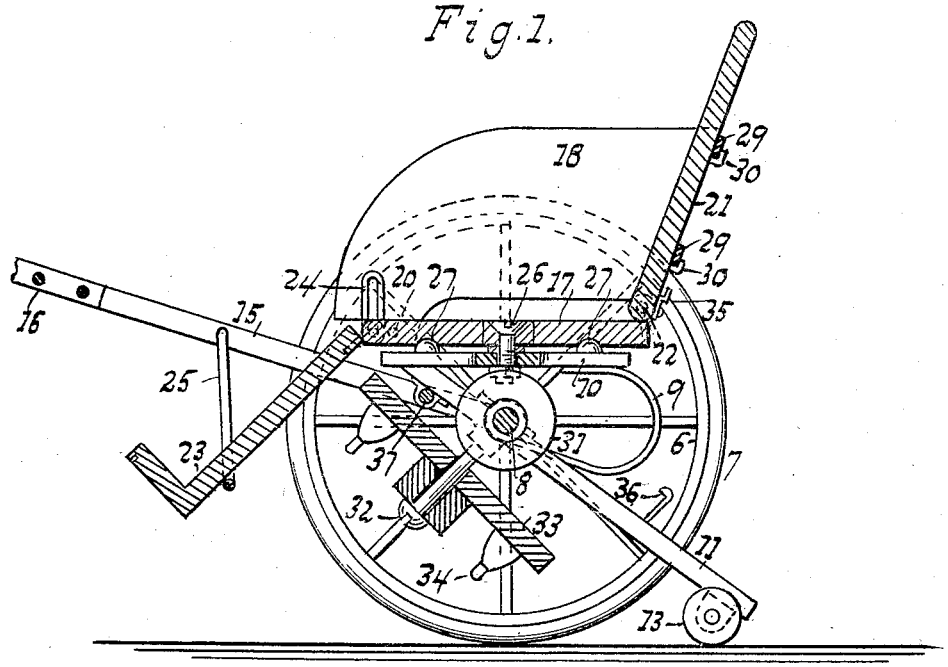
Figure 1 represents a sectional side elevation showing the seat open.

In these drawings is shown a vehicle consisting of a pair of wheels 6 having elastic tires 7 secured to the wheels. On the wheels is mounted an axle 8 which is rotated when the wheels travel along the ground. One of the wheels can be loosely mounted on the axle so as to compensate for the differential rotation when turning corners. A pair of springs 9 have their lower ends coupled to the axle and a plate 10 is fixed to the upper portion of the springs. To the forward part of the plate is secured a bar 11 having a cap or strap 12 for loosely connecting the bar to the axle. This construction permits the axle to rotate while the bar and plate remain stationary. The lower rear portion of the bar is equipped with a small wheel 13 to contact with the ground so as to prevent backward throw of the cart. Connected to the axle is a bail 15 having a handle or draw bar 16 for pushing or pulling the vehicle.

On the plate 10 is arranged a seat including a floor 17 having sides 18 swingingly mounted at 20 to the floor. A back 21 is swingingly connected at 22 to the rear portion of the floor, and a foot section 23 is pivotally connected to a pair of slotted brackets 24 secured to the sides of the floor. A hanger 25 connected to the bail and coacting with the foot section prevents downward fall of the section, as indicated in Fig. 1. When not in use, the hanger can be swung up out of the way as shown in Fig. 2.

A bolt 26 secured to the plate 10 and connected to the floor permits the floor with the body when folded to be rotated so that the seat can be positioned to face in an opposite direction from that shown. Spring studs 27, best seen in Fig. 1, coacting with sockets or indentations in the bottom of the floor will secure the seat in both positions. When the seat is open the back is limited in its movement by means of a pair of straps 29 secured to the sides and extending across the back. Hooks 30 secured to the back engage the straps and lock the parts together.

The vehicle also combines a toy consisting of a pair of friction disks 31 secured to the axle and rotated therewith when the vehicle is traveling along the ground. The bar 11 has secured to it a bolt 32 with a turn table 33 slidingly mounted thereon. The turn table carries a number of amusing objects 34 such as animals or toy soldiers. As seen in Fig. 1 when the seat is open and ready for use, the turn table will be out of engagement with the friction disks and thus remain stationary.

Figure 2:
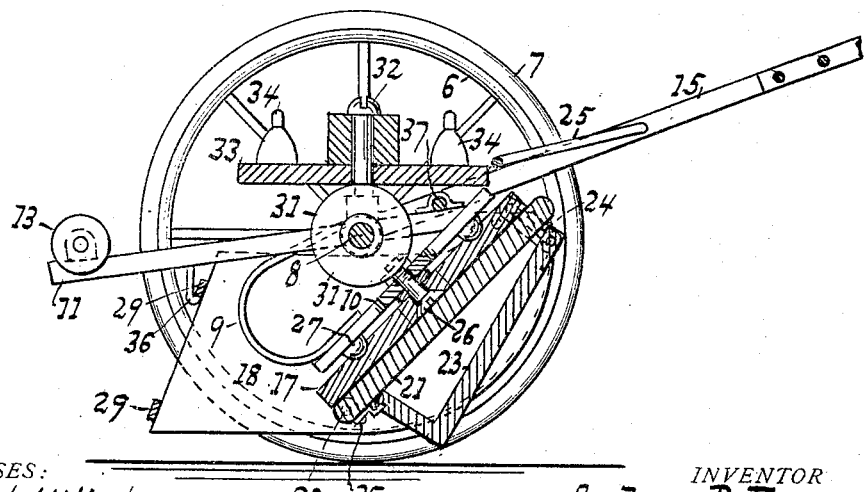
Fig. 2 is a similar view showing the seat closed and the toy in action.

When it is desired to turn the seat from its forward to rearward position, the sides are slightly lifted to swing the straps 29 clear of the hooks, the back can then be swung over on to the seat, as indicated in Fig. 2, and the foot section will swing over on top of the back. In this position the seat can be rotated about the bolt 26 to the required position. In order to hold the back and the front sections to the seat when folded, a latch 35 is provided, best seen in Fig. 2. The sides 18 are also held in place by a spring catch 36 engaging one of the straps 29 connected to the sides. When the seat is folded as shown, the vehicle can be converted into a toy by swinging the bar 11 about the axle to point in the opposite direction, as denoted in Fig. 2. The movement of the bar is transmitted to the plate, seat and turn table, and the turn table will assume its position above the axle while the seat is below. When the turn table is above the axle, it gravitates on to the friction disks and is given rotary motion while the vehicle is traveling along the ground.